Feb. 24, 1959     E. A. HANFF     2,875,261
MAGNETOMOTIVE AGITATOR FOR MOLTEN METAL BATHS OR THE LIKE
Filed Feb. 26, 1957     3 Sheets-Sheet 1

INVENTOR.
EDWARD A. HANFF
BY
Hooper, Leonard & Buell
his attorneys

INVENTOR.
EDWARD A. HANFF

Feb. 24, 1959 E. A. HANFF 2,875,261
MAGNETOMOTIVE AGITATOR FOR MOLTEN METAL BATHS OR THE LIKE
Filed Feb. 26, 1957 3 Sheets-Sheet 3
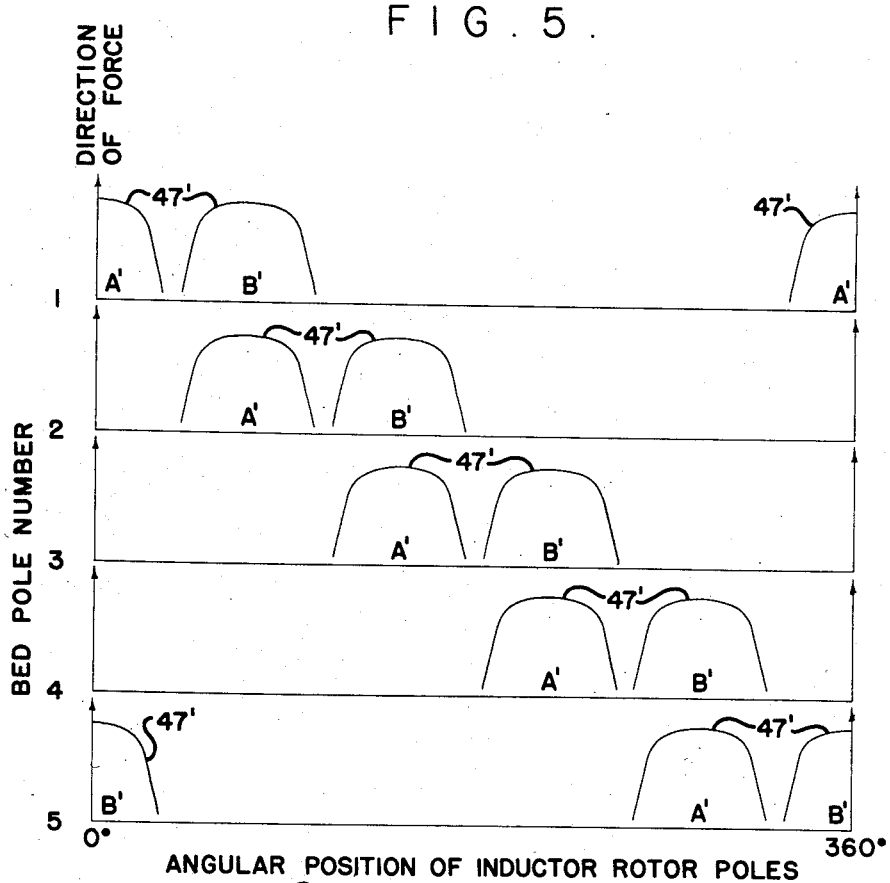
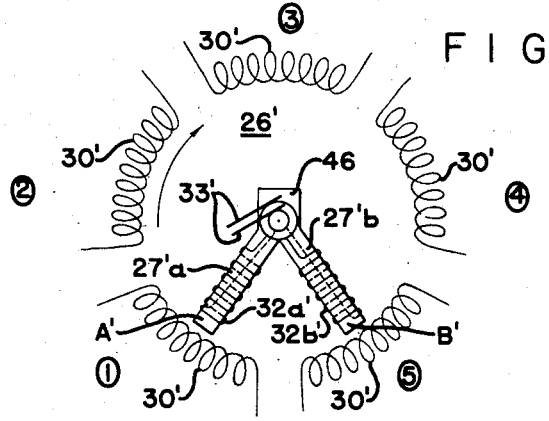
INVENTOR.
EDWARD A. HANFF

United States Patent Office 2,875,261
Patented Feb. 24, 1959

2,875,261

MAGNETOMOTIVE AGITATOR FOR MOLTEN METAL BATHS OR THE LIKE

Edward A. Hanff, Wilkinsburg, Pa., assignor to Swindell-Dressler Corporation, Pittsburgh, Pa., a corporation of Pennsylvania Application February 26, 1957, Serial No. 642,493

10 Claims. (Cl. 13—26)

This invention relates to a magnetomotive agitator or stirrer for baths or molten substances including metal such as may be found, for example, in electric arc melting and/or refining furnaces. More particularly, this invention pertains to new and flexible means for generating controllable induction forces for the stirring of such molten metal.

Prior induction practices have involved relatively cumbersome and expensive equipment which moreover could not be significantly varied in output. In the case of stationary devices for induction stirring of molten metal, one common practice has required the fabrication of highly special machinery which moreover was of a relatively inflexible nature. Others, as exemplified in Patents Nos. 2,573,319 and 2,686,823, provided other devices to move a magnetic field physically in relation to the container for the molten metal to be stirred.

In my invention, such deficiencies are overcome and the magnetic field produced for stirring action of a molten bath of a material like metal preferably is not moved physically. Further, a construction made in accordance with my invention may be regulated to produce a relatively sharply peaked, pulsating force in the bath which will effectively stir the molten material therein by the generation in such bath of a repulsion force due to mutual induction. Further, by means of embodiments made in accordance with this invention, the pulsating force, cyclic interval, magnitude, direction and wave form may be regulated and controlled in accordance with the desired selection for most efficient stirring action in the bath of the particular fluent material to be handled. Other objects, features and advantages will be apparent from the following description and from the accompanying drawings, which are schematic only, in which Figure 1 is a schematic wiring diagram of one embodiment of my invention suitable for stirring a bath of molten steel contained, for example, in an electric arc furnace;

Figure 4 shows a modified form of an inductor utilizable in an embodiment of this invention;

Figure 5 is a diagram illustrating a pulsating force producible by such embodiment when utilizing the inductor of Figure 4.

Figure 1:
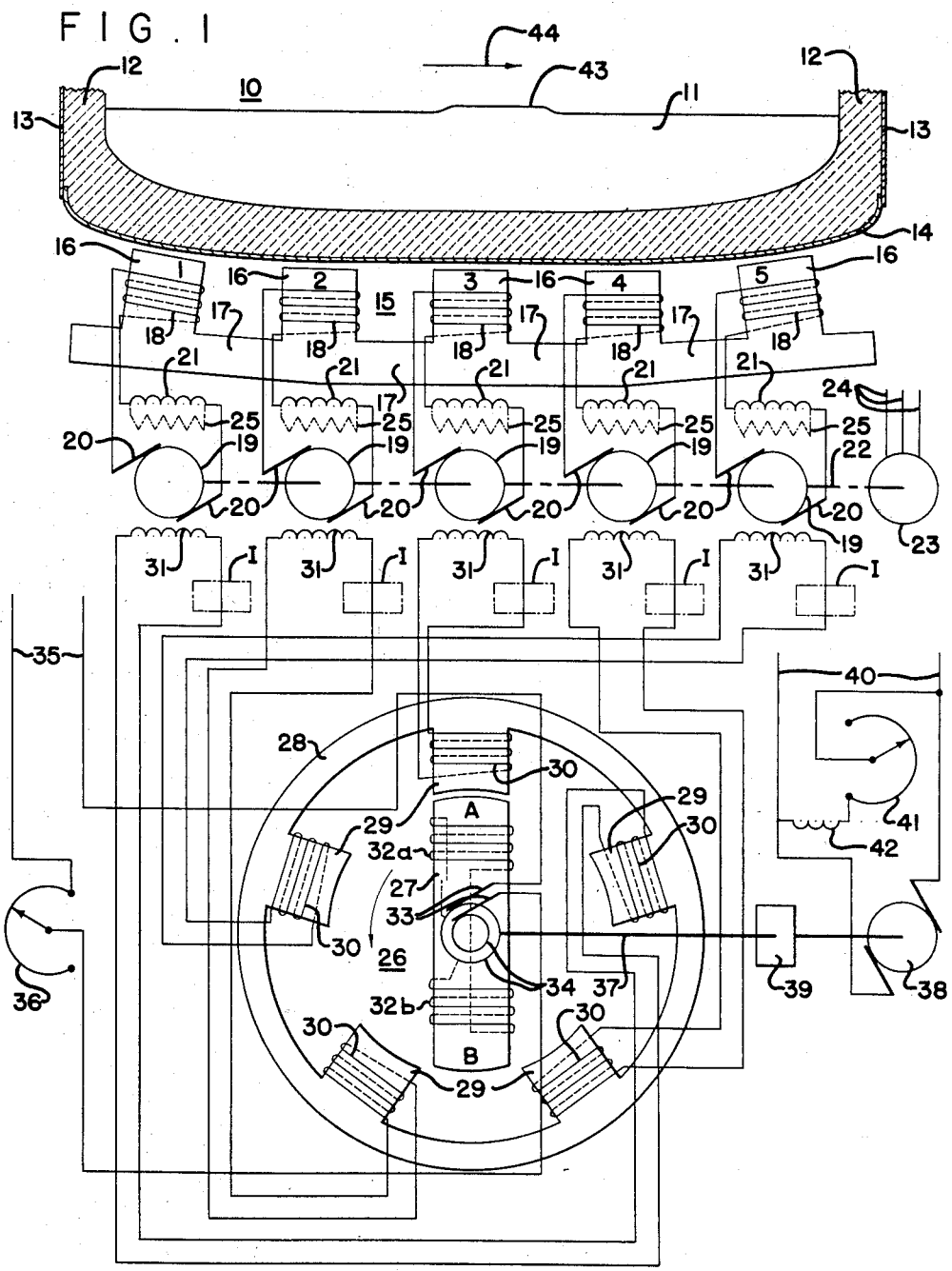
Figure 3:
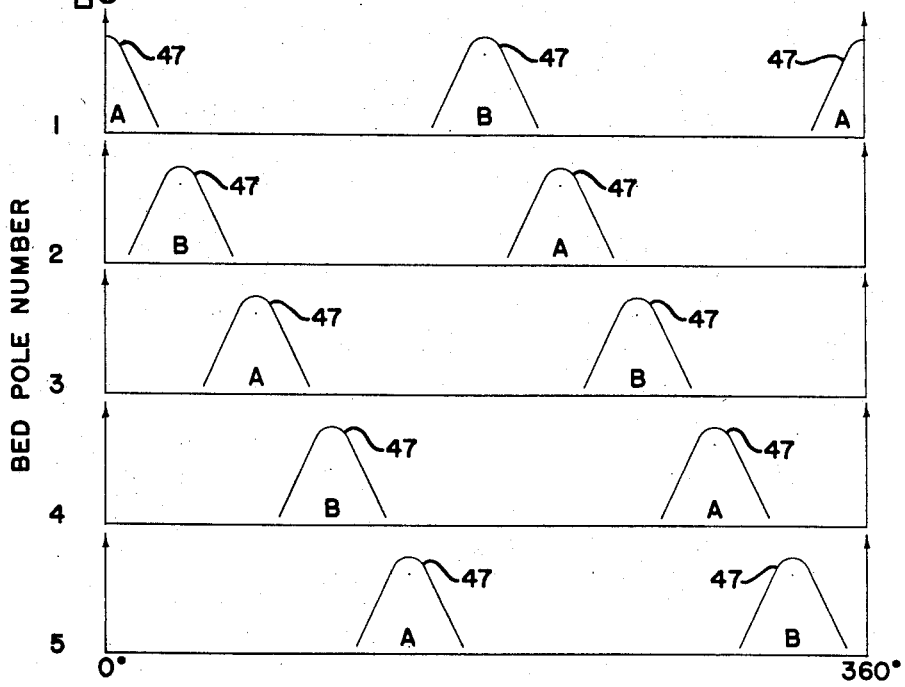
Figure 3 is a diagram illustrating a pulsating force of regulated characteristic producible by the new construction of Figure 1 to provide stirring movement in the molten metal bath shown.
Figure 2:
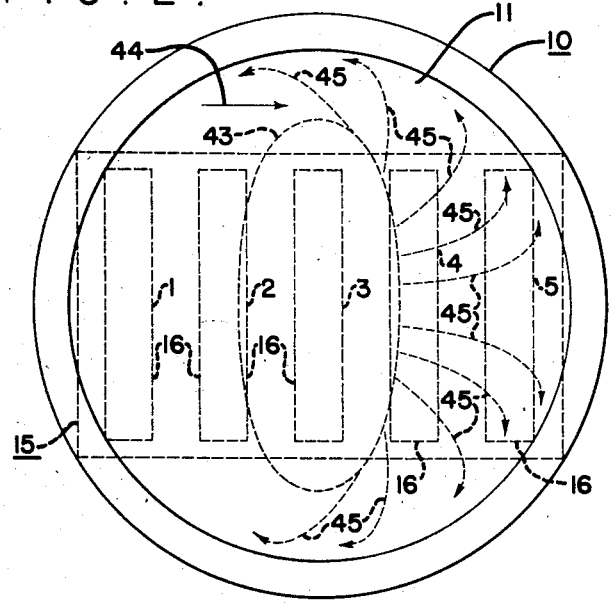
Figure 2 is a plan view of the furnace bath portion shown in Figure 1 to illustrate a stirring action provided by the new construction shown in Figure 1.

Referring to Figures 1 to 3 of the drawings, a portion of a furnace 10 like an electric arc furnace is shown containing a pool 11 of a molten material like steel undergoing melting and/or refining in furnace 10. As shown, portion 10 includes a refractory material 12 lining the metal-containing part of the furnace, such refractory being within a metal shell 13 having a metal bottom 14, which metal bottom 14 is preferably non-magnetic or paramagnetic. A stationary induction stirrer 15 is provided having a ferromagnetic core like a "bed" closely adjacent the underside of bottom 14 and may be made so as to move therewith in the event that furnace 10 is a furnace of a tilting or oscillating type. Such core is preferably made of laminar sheets of a ferromagnetic material placed side-by-side so as to provide salient members 16 joined together by connecting yoke reaches 17. Each salient member 16 acts as a pole, and are consecutively numbered 1 to 5 respectively from left to right as viewed in Figure 1. Field coils 18 of stirrer 15 in the illustrated embodiment are each connected across the armature of an individual commutator generator 19 by means of brush riggings 20. If desired for greater flexibility, a field winding 21 may be connected in series with the turns of the respective coil 18.

The generators 19 are preferably gang connected by a shaft 22 which is turned by an alternating current motor 23 utilizing a conventional power source 24 shown as a three-phase source. Such generators 19 produce pulsating unidirectional current and further materially amplify and boost the excitation current and voltage components impressed through the field windings upon the respective armatures of such generators for preselected regulation of the stirring force magnitude and wave form characteristic. If desired, the generators 19 may be separately driven by individual motors. If desired further, shunt diverters 25 may be included as variable shunts to afford greater adjustment relative to the windings 21 for additional regulation of the outputs of generators 19 respectively. For example, in molten metal baths of non-uniform depth over the entire extent thereof, the diverters 25 may, if desired, be used to regulate the induction force generated by different pole members of stirrer 15 in proportion to such respective depths. Thus, diverter 25 for the respective stirrer pole members 1 and 5 may be utilized to provide flux of somewhat lesser magnitude for the shallower marginal edge portions of bath 11 relative to the flux issuing from the pole members 2 and 4 inclusive nearer to deeper portions of bath 11, for balance in the desired stirring.

An inductor 26 of an alternator-type is provided with a rotor 27 and a stator 28. Stator 28 is provided with pole pieces 29 corresponding in number, or a multiple of the number, of pole members 16. Each of the pole pieces 29 is provided with a relatively concentrated stator coil 30, the terminals of which are connected to a generator field winding 31 respectively for separately impressing an adjustable magnetic field upon a respective generator 19 serving its respective pole member 16. Other arrangements of inductor 26 and/or the optional use of interpole pieces and windings is not shown and would not be a departure from my new principle and combination disclosed herein. Hence, the output of a generator 19 is controlled by the field generator by its respective winding 31, inclusive of the influence of any series winding 21 that may be embodied. The rotor 27 and stator 28 are preferably made of laminated ferromagnetic construction, the opposite ends A and B of rotor 27 having opposite polarities due to the rotor windings 32a and 32b thereon.

Exciting current for inductor 26 is passed through the windings 32a and 32b by means of the respective slip rings 34 which are engaged respectively by brushes 33 in the embodiment shown. Such excitation by unidirectional current may be provided by any suitable direct current source 35 such as a direct current generator, or a rotary convertor, or by an alternating current source employing a suitable rectifier. A rheostat 36 may be included to preselect the magnitude of such excitation.

Figure 6:
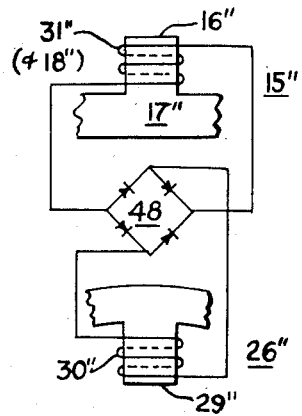
Figure 6 is a partial view of the Figure 1 embodiment inductor with alternating current excitation and rectified output directly connected respectively to the induction bed poles.

If desired, inductor 26 may also be constructed for alternating current excitation with an alternating current output therefrom to be amplified and controlled, for example, by a magnetic amplifier and rectified so that the current supplied to the windings 31 is unidirectional (e. g., see Figure 6).

Rotor 27 is preferably independently driven by a shaft 37 which is turned by a prime mover such as a variable speed direct current motor 38 through a speed reducer 39 so that rotor 27 preferably rotates at a relatively slow speed, thereby regulatably controlling the pulsating force produced by the construction of Figure 1 in the course of rhythmic agitation and stirring of molten bath 11 as the magnetomtive fields for that purpose are successively produced in the area of the pole members 1 to 5, inclusive and respectively. Motor 38 may be connected to a direct current power source 40 with a rheostat 41 in series with field winding 42 for selected speed regulation by such means, or by other suitable means. Other kinds of variable speed drives may be used instead in a practice of my invention. Since the magnitude of the repulsion effect on the molten metal and the speed of rotor 27 may be varied under my invention, a perons operating my new device can select the force magnitude and cyclic frequency which will yield the optimum "rate of progression" for the stirring wave or bulge and the optimum operating conditions for the most effective agitation or stirring of the fluent metal.

In operation, as rotor 27 slowly rotates, for example, in a counterclockwise direction, the stirrer pole members 1 to 5 and respective coils 18 will successively generate magnetomotive force fields in that order preferably with rather sharply peaked flows of magnetic flux penetrating the bottom of furnace 10 and entering the molten bath 11 to induce currents therein which will yield a mutual induction effect, a repulsion force and thereby a stirring action in the form of a moving wave or bulge 43 on the surface of pool 11 slowly traveling in the direction of arrow 44 with accompanying metal flow as generally illustrated in part by dash lines 45. The regulation of cycle time, direction, magnitude and force form characteristics achievable by a practice of my invention in the pulsating force produced for effective stirring is illustrated for a Figure 1 operation in the Figure 3 diagram. That diagram shows a series of induction impulses 47, of relatively sharply peaked wave form, generated in the course of one complete revolution of rotor 27 starting with rotor end A in full linked relation to that stator coil 30 connected to the field winding 31 in the circuit of stirrer member 1. By virtue of an embodiment such as the new construction shown in Figure 1, effective and flexible control and regulation of agitation and stirring of molten substances may be obtained by readily assemblable and relatively uncomplicated lower cost means.

Moreover, while Figure 1 illustrates an inductor in which the output is impressed upon the fields of respective amplifying generators 19, it will be recognized by those to whom this invention is disclosed that intermediate amplifying means I, of electronic or other nature, may be introduced in the output circuit of such an inductor so that an amplified output is available as a stronger field, with the result that lower rated amplifying generators 19 may be used, or a relatively smaller inductor and its associated drive may be employed, or a combination of both such advantages may be realized. Still further, in the event, particularly, of smaller baths or lighter fluent material to be agitated or stirred, an inductor unit as disclosed herein may be constructed of such size and strength that the output thereof may be fed directly to windings corresponding to coils 18 of the Figure 1 embodiment to create flux for induction stirring in the material of such bath as described herein. Thus, as shown in Figure 6, the stator coils 30" of an inductor like that shown in Figure 1 may be directly connected to output coils 31" to serve as the excitation means for the induction bed pole pieces 16". A rectifier 48 may be provided in the intercoil connection to convert the output of inductor 26" into one having a pulsatory unidirectional current character.

Figure 4 illustrates a modification of an inductor suitable for use in the embodiment illustrated in Figure 1, parts of which inductor in Figure 4 corresponding generally in function to parts in inductor 26 are provided with the same reference numerals respectively with the addition of a prime accent thereto. Such Figure 4 modification illustrates a mode by means of which characteristics of the pulsating force utilized in a stirring action produced in accord with my invention may be modified as illustrated in the diagram of Figure 5. In inductor 26', rotor arms 27'a and 27'b with the respective pole ends A' and B' are rigidly connected at a fixed angle and provided with a counterweight 46 to maintain dynamic balance in the course of an operation, although the speed of rotor 27', as in the case of rotor 27, will normally be relatively low in keeping with the relatively low cycle frequency that would usually be selected, thereby reducing any likelihood of dynamic imbalance. In addition, in inductor 26', the stator windings 30' are of the distributed type and may be connected to field windings like windings 31 in the circuits of the respective stirrer coils 18. Thus, if inductor 26' has its stator windings 30' respectively connected, in place of inductor 26, to generator field windings for the respective pole members numbered 1 to 5 inclusive in Figure 1, as indicated in Figure 4 by the pole member numbers appearing in circles adjacent such respective windings 30', then the rotation of rotor 27' in a clockwise direction will operate the new combination as indicated in the diagram of Figure 5. Therein, the upward component of the pulsating force for stirring is shown by the ordinate arrows on the left-hand side of the diagram which, as in the diagram of Figure 3, illustrate the repulsion effect producing a wave or bulge in bath 11 traveling from left to right as viewed in Figure 1 for such clockwise rotation of inductor rotor 27'. Moreover, the use of distributed windings 30' somewhat widen the crest characteristics of the force magnitude outlines 47' and such force trace 47' is also provided with an overlapping dual-maximum characteristic. The cyclic interval and rate of progression of the induction force for such stirring can be varied, as set forth above, by changing the speed of motor 38. And, if desired, motor 38 may be selected as a reversible motor in which case if rotor 27' were rotated in a counterclockwise direction, the pulsating stirring force produced in bath 11 would travel from right to left as viewed in Figure 1, or in a single refining operation for somewhat different agitation a person might operate inductor 26' by the rotation of rotor 27' first in one direction and then in the other direction. While inductor machine 26' is shown as having an odd number of stator poles illustrated by the windings 30', it is also possible to provide such inductor with an even number of stator poles in which event the spacing thereof would preferably be such that when rotor arm 27'a is sweeping across the face of a winding 30', the rotor arm 27'b would be sweeping a space between adjoining windings 30", and vice versa.

Although the illustrated embodiment has been described in cooperation with an electric arc furnace, it will be realized that practices of this invention may be utilized with other types and kinds of furnaces and with types and kinds of fluent material other than molten metal. Moreover, various modifications may be made in the illustrated embodiment without departure from the spirit of my invention or the scope of the appended claims.

I claim:

1. In a magnetomotive agitator for a furnace or the like having a refractory hearth to support a pool of molten metal, apparatus comprising, in combination, a magnetic structure having a plurality of poles extending in a selected direction across said pool, a plurality of pulsating unidirectional current exciting coils for said poles respectively, said structure being mounted below a substantially non-magnetic housing having said hearth therein in proximity to said pool, generator mechanism output connections respectively leading to said coils to supply at an amplified level of magnitude said pulsating unidirectional current thereto to generate magneto-motive force at said poles in a predetermined sequence progressing in said selected direction, means for driving said mehanism, and means for impressing pulsating fields upon said mechanism in said sequence.

2. In a magnetomotive agitator for a molten metal bath or the like, apparatus comprising, in combination, an induction member having poles in juxtaposition to said bath or the like, field coils for said poles respectively, means to excite said field coils in a selectively regulable manner, a generator mechanism in said means having each of said field coils connected thereto for excitation in progressively phased relation, drive means for said mechanism, means for selectively varying the excitation impressed upon said mechanism, and independent means for driving said last-mentioned means.

3. In a magnetomotive agitator for a molten metal bath or the like, apparatus comprising, in combination, a stationary induction member having spaced flux-generating poles in juxtaposition to said bath or the like, field coils for said poles respectively, means to excite a plurality of generators having their outputs respectively connected to said field coils for phased excitation of said field coils in a selectively regulable manner, means for driving said generators, a field for each generator, and inductor means connected to said fields to regulate the same and their phasing, and independent means for driving said last-mentioned means.

4. In a magnetomotive stirrer for a molten metal bath or the like, apparatus comprising, in combination, an alternator-type inductor having a rotor and a stator with a plurality of stator poles, means to drive said rotor at a preselected speed, stator coils for said poles, adjustable excitation means for said stator coils, a plurality of direct current generator field windings respectively in series with said stator coils, a plurality of direct current generators connected to be separately and progressively exicted by said generator field windings to provide progressive phasing of the respective generator outputs, a prime mover to rotate the armatures of said generators at a predetermined speed, and an induction stirring bed having spaced pole members and field coils respectively for said pole members, said field coils being connected in the armature circuit of the respective ones of said generators.

5. In a magnetomotive stirrer for a molten metal bath or the like, apparatus comprising, in combination, an alternator-type inductor having a rotor and a stator with a plurality of stator poles, means to drive said rotor at a preselected speed, stator coils for said poles, adjustable excitation means for said stator coils, a plurality of direct current generator field windings respectively in series with said stator coils, a plurality of direct current generators connected to be separately and progressively excited by said generator field windings to provide progressive phasing of the respective generator outputs, a prime mover to rotate the armatures of said generators at a predetermined speed, an induction stirring bed having spaced pole members and field coils respectively for said pole members, said field coils being connected in the armature circuit of the respective ones of said generators, and an additional adjustable series winding for each said generator in the circuit of its respective field coil.

6. In a magnetomotive stirrer for a molten metal bath or the like, apparatus comprising, in combination, a stirring bed having spaced pole members in juxtaposition to said molten metal bath or the like and field coils cooperating with said poles respectively, a separate generator for each of said field coils connected to provide amplified current for the generation of magnetomotive energy successively in said field coils respectively in a preselected direction to stir said bath or the like, means for driving said generators at a predetermined speed, adjustable excitation means for said generators respectively, said last-mentioned means including an inductor having a rotor and stator, said stator having a plurality of poles at least equal in number to the number of said pole members, and a variable speed drive for said rotor.

7. In a magnetomotive stirrer for a molten metal bath or the like, apparatus comprising, in combination a stirring bed having spaced pole members in juxtaposition to said molten metal bath or the like and field coils cooperating with said poles respectively, a separate generator for each of said field coils connected to provide amplified current for the generation of magnetomotive energy successively in said field coils respectively in a preselected direction to stir said bath or the like, means for driving said generators at a predetermined speed, adjustable excitation means for said generators respectively, said last-mentioned means including an inductor having a rotor and stator, said stator having a plurality of poles at least equal in number to the number of said pole members, a variable speed drive for said rotor, and means for regulating the excitation of said rotor, whereby the magnetomotive force, direction and stirring action wave characteristic can be selectively controlled.

8. In combination, a furnace adapted to contain a bath of molten metal, said furnace being lined with refractory, said furnace further having a metal shell with the bottom of said shell on the underside of said bath being substantially constructed of a non-magnetic material, a magnetomotive agitator positioned adjacent the underside of said furnace, a plurality of parallel poles extending transversely parallel to one another, a continuous longitudinally extending yoke connecting said poles, a pole winding for each of said poles adapted to generate flux thereat, a plurality of amplifying generators, each pole winding being connected to the output of one of said generators, means for driving said generators, an inductor having a plurality of angularly spaced pole pieces, a driven rotor for said inductor, said rotor having ends of opposite polarity to respectively and successively sweep past said pole pieces, means for varying the field strength of said rotor, and inductor windings associated with each of said pole pieces, said inductor windings being respectively connected to the fields of said generators, whereby magnetic flux having a relatively sharp peaked characteristic may be successively and progressively generated in said poles for movement into and through said bath of molten metal through said furnace to progressively stir the same in the course of the operation of such furnace.

9. In a magnetomotive agitator for molten metal baths or the like, apparatus comprising, in combination, an inductor having an odd number of concentrated winding poles in its stator, a multiple rotor in said inductor, means for exciting said rotor, means for varying the magnitude of said rotor excitation, means for rotating said rotor, means for adjusting the speed of rotation of said rotor, a plurality of induction poles progressing in a given direction in juxtaposition to said molten metal bath or the like, means for transmitting the output from a selected winding pole of said inductor to a selected induction pole as unidirectional current, and means for causing said current to excite each of said induction poles respectively in a progressive direction at a selected magnitude and cycle frequency for the generation of mutual induction to agitate said molten metal bath and the like.

10. In a magnetomotive agitator for molten metal baths or the like, apparatus comprising, in combination, an inductor having a multipole stator and a multipole rotor, adjustable means for providing a selected speed of rotation for said rotor, adjustable means for providing a selected magnitude of excitation for said rotor, an induction bed placed in juxtaposition to said molten metal bath or the like, said bed having a plurality of poles with coils for the generation of flux to be introduced into said molten metal bath or the like, means for transmitting the output from a selected stator pole of said inductor and magnifying the same to provide pulsating unidirectional current flow in said coils respectively in a progressive direction for the generation of said flux and agitation of said molten metal bath and the like.

References Cited in the file of this patent

UNITED STATES PATENTS

| | | |
|---|---|---|
| 1,851,984 | Rennerfelt | Apr. 5, 1932 |
| 2,198,304 | Cornelius | Apr. 23, 1940 |
| 2,363,582 | Gerber et al. | Nov. 28, 1944 |
| 2,573,319 | Dreyfus et al. | Oct. 30, 1951 |
| 2,620,366 | Ladell | Dec. 2, 1952 |
| 2,686,823 | Jones | Aug. 17, 1954 |

UNITED STATES PATENT OFFICE
CERTIFICATE OF CORRECTION

Patent No. 2,875,261                                February 24, 1959

Edward A. Hanff

It is hereby certified that error appears in the printed specification of the above numbered patent requiring correction and that the said Letters Patent should read as corrected below.

Column 2, line 12, for "and are" read -- which are --; line 58, for "generator" read -- generated --; column 3, line 14, for "magnetomtive" read -- magnetomotive --; line 24, for "perons" read -- person --; column 5, line 10, for "magneto-motive" read -- magnetomotive --; line 13, for "mehanism" read -- mechanism --; line 47, for "exicted" read -- excited --; column 6, line 16, after "combination" insert a comma.

Signed and sealed this 7th day of July 1959.

(SEAL)
Attest:

KARL H. AXLINE                                        ROBERT C. WATSON

Attesting Officer                                       Commissioner of Patents